United States Patent [19]

Avon et al.

[11] 4,444,572
[45] Apr. 24, 1984

[54] PROCESS AND INSTALLATION FOR PURIFICATION OF THE HELIUM CONTAINED IN A MIXTURE OF GAS

[75] Inventors: Michel F. Avon, Carry-le-Rouet; Gérard R. Markarian, Marseille, both of France

[73] Assignee: Societe Anonyme Dite: Compagnie Maritime d'Expertises S.A., France

[21] Appl. No.: 402,335

[22] Filed: Jul. 27, 1982

[30] Foreign Application Priority Data

Jul. 28, 1981 [FR] France .................. 81 14809

[51] Int. Cl.³ ............................................. B01D 53/04
[52] U.S. Cl. ......................................... 55/26; 55/68; 55/74; 55/66; 62/18
[58] Field of Search .............. 55/25, 31, 33, 58, 66–68, 55/74, 179, 386, 387, 26; 62/17, 18

[56] References Cited

U.S. PATENT DOCUMENTS

| | | | |
|---|---|---|---|
| 2,826,908 | 3/1958 | Skarstrom | 55/33 X |
| 3,085,379 | 4/1963 | Kiyonaga et al. | 55/66 X |
| 3,257,773 | 6/1966 | Connors et al. | 55/31 |
| 3,279,153 | 10/1966 | Basmadjian et al. | 55/66 X |
| 3,445,990 | 5/1969 | Hays et al. | 55/66 X |
| 3,616,602 | 11/1971 | Hays et al. | 55/66 |
| 3,838,553 | 10/1974 | Doherty | 55/66 X |
| 3,839,847 | 10/1974 | Banikiotes et al. | 55/58 |
| 3,963,462 | 6/1976 | Golovko et al. | 55/66 X |
| 3,996,028 | 12/1976 | Golovko et al. | 55/66 X |
| 4,093,429 | 6/1978 | Siegler et al. | 55/66 X |
| 4,238,211 | 12/1980 | Stuart | 62/18 X |

FOREIGN PATENT DOCUMENTS 1444231 7/1976 United Kingdom .

OTHER PUBLICATIONS

Chem. Abstracts, vol. 82, No. 26, 6/30/75, 173062t.

Primary Examiner—Robert H. Spitzer
Attorney, Agent, or Firm—Lewis H. Eslinger

[57] ABSTRACT

The present invention relates to a process and an installation for purification of the helium contained in a mixture of gas, employing a pre-treatment unit to retain the impurities such as water, carbon dioxide gas and heavy organic compounds, and at least one reactor of the chromatographic type located downstream of said pre-treatment unit, said process comprising the following steps of:

(a) adjusting the pressure of the mixture of gas until the working pressure of the phase of adsorption is obtained, this pressure being between 10 and 30 bars, and preferably 12 to 15 bars;

(b) taking the temperature of the mixture of gas at the outlet of said pre-treatment unit until it is located in the range −15° C./−35° C., and preferably −25° C.;

(c) and sending the mixture of gas into the reactor and passing it through an absorbent, which is constituted by a microporous charcoal whose pores are of dimensions less than or equal to 20 Å.

11 Claims, 3 Drawing Figures

PROCESS AND INSTALLATION FOR PURIFICATION OF THE HELIUM CONTAINED IN A MIXTURE OF GAS

The present invention relates to a process and installation for purifying the helium contained in a mixture of gas.

The techical sector concerned by the invention is that of equipment and processes for the purification of gases, particularly respiratory gases used in the domain of deep-sea diving.

Two means are known at present for obtaining purification of the gases, particularly respiratory gases, to retain the impurities which they contain with a view to the purification of the helium.

According to a first, so-called cryogenic means, the impurities are retained at very low temperature, for example of the order of $-170°$, by using liquid nitrogen. This technique gives good results but, as it requires a liquid nitrogen supply on the site, it is not always very practical or profitable depending on the cases of use, for example when an offshore unit is to be supplied for carrying out underwater works during which a large quantity of respiratory gases is consumed.

According to a second means, the gas is purified by adsorption at ambient temperature, but this process has up to now never given good results, although it is advantageous at implementation level.

It is an object of the present invention to remedy the drawbacks of the heretofore known processes and to provide a solution to the question relative to purification of the helium contained in a gaseous mixture by applying a new technique employing refrigeration but not requiring a supply of liquid nitrogen in situ and employing means for approaching the so-called ambient temperature technique, whilst improving the functioning thereof to render this technique efficient from the industrial standpoint.

This object is attained by the process for purification of the helium contained in a mixture of gas, employing a pre-treatment unit to retain the impurities such as water, carbon dioxide gas and heavy organic compounds, and at least one reactor of the chromatographic type located downstream of said pre-treatment unit, said process comprising the following steps of:
 (a) adjusting the pressure of the mixture of gas until the working pressure of the phase of adsorption is obtained, this pressure being between 10 and 30 bars, and preferably 12 to 15 bars,
 (b) taking the temperature of the mixture of gas at the outlet of said pre-treatment unit until it is located in the range $-15°$ C./$-35°$ C., and preferably $-25°$ C.;
 (c) and sending the mixture of gas into the reactor and passing it through an adsorbent, which is constituted by a microporous charcoal whose pores are of dimensions less than or equal to 20 Å.

According to this process and after the adsorption phase, the decompression of the mixture of gas is controlled by placing the reactor in communication with the atmosphere, after which phase of decompression, a depression is created in said reactor until a vacuum less than or equal to 1 Torr is attained to regenerate the microporous charcoal, The residual quantity of mixture of gas contained in the reactor is firstly decompressed until a pressure of between 1 and 5 bars, and preferably 3 bars is attained and, during this decompression, the mixture of gas is sent into a storage tank before recycling, to recover the helium contained in the mixture and, after having attained this pressure, the reactor is then purged to reject to the atmosphere the quantity of mixture which is too rich in impurities, then a vacuum is created in the reactor.

According to said process in which three reactors (R1,R2,R3) are used which are connected together and adapted to be placed separately in communication with the other apparatus of the installation or to be isolated from said apparatus for a continuous purification of the helium, and for a cycle of operation, the following steps are effected:
 (A-a) pressurizing the reactor R1 with the mixture of gas for a time $t_1$;
  (b) at the end of this pressurization phase, continuing the phase of adsorption by circulating the mixture of gas in the reactor R1 and maintaining adsorption for a period $T_1$;
  (c) at the end of the adsorption phase, decompressing the mixture of gas for a time $t_2$;
  (d) at the end of the decompression phase, creating a depression in reactor R1 which is maintained for a period $T_2$, to regenerate the microporous charcoal;
  (e) at the end of the regeneration phase, starting a new cycle by compressing the mixture of gas for a time $t_1$.
 (B-a) Simultaneously and before the end of the adsorption phase (Ab) of reactor R1, compressing the mixture of gas for a time $t_1$ which terminates with the end of the phase of absorption of said reactor R1;
  (b) at the end of this compression phase, continuing the phase of adsorption by sending the mixture of gas into the reactor R2 and maintaining the adsorption for a period $T_1$;
  (c) then carrying out operations (Ac), (Ad), (Ae) on the reactor R2 in the same way as on reactor R1.
 (C-a) Simultaneously and before the end of the phase of adsorption (Bb) of reactor R2, compressing the mixture of gas for a time $t_1$ which terminates with the phase of adsorption of said reactor R2;
  (b) at the end of this compression phase, continuing the phase of adsorption by sending the mixture of gas into reactor R3 and maintaining the adsorption for a period $T_1$;
  (c) then carrying out operations (Ac), (Ad), (Ae) on reactor R3 in the same manner as on reactor R1;
   the phases of adsorption (Bb) of reactor R2 and (Cb) of reactor R3 being effected successively in the same time during which operations (Ac) of decompression of the gaseous mixture; (Ad) of regeneration of the microporous charcoal and (Ae) of compression of said mixture are made on reactor R1;
   and continuing the process with the three reactors R1, R2, R3.

An installation for purifying the helium contained in a mixture of gas for carrying out the above process, said installation comprising a pre-treatment unit comprising at least one filter containing an adsorbent and/or an absorbent, of which the outlet is connected to the inlet of at least one chromatographic reactor at the outlet of which the purified helium is sent, via a booster, into a high pressure storage unit, is characterised in that the mixture of compressed gas issuing from the pre-treatment unit is sent into an exchanger device comprising an economizer and a cooler, itself connected to a refrigerating unit, which device is located downstream of said pre-treatment unit and upstream of said reactor to place the mixture of gas at the working temperature of the adsorption phase.

In this installation, of which the chromatographic reactor adopts the form of a cylindrical tower and comprises a lower grid and an upper grid which, with the wall of the tower, delimit the adsorbent, the inner diameter of the reactor is at the most one third of the distance which separates said grids.

The invention results in the purification of the helium contained in a mixture of gas by elimination of the organic pollutants, carbon dioxide gas and water and adjustment of the concentrations of nitrogen and oxygen in a gaseous mixture.

One application of the process and installation according to the invention is the recovery of helium from pockets of natural gas.

Another application of the invention is the purification of the helium contained in the respiratory gas mixtures used by deep-sea divers in the course of underwater works.

An advantage of the invention is that it enables the helium to be purified by the selective retention of the undesirable compounds by using a microporous adsorbent, in a chromatographic reactor under pressure and at low temperature, of the order of $-25°$ C. produced by currently used industrial refrigerating units.

The technique according to the invention is interesting as it can be applied on land and at sea with the energy means existing in situ without having to employ techniques requiring supplies in special, expensive containers which are not practical to convey to the site, such as for example liquid nitrogen which is necessary for applying the cryogenic techniques for purifying the helium.

The invention will be more readily understood on reading the following description with reference to the accompanying drawings, in which.

Figure 1:
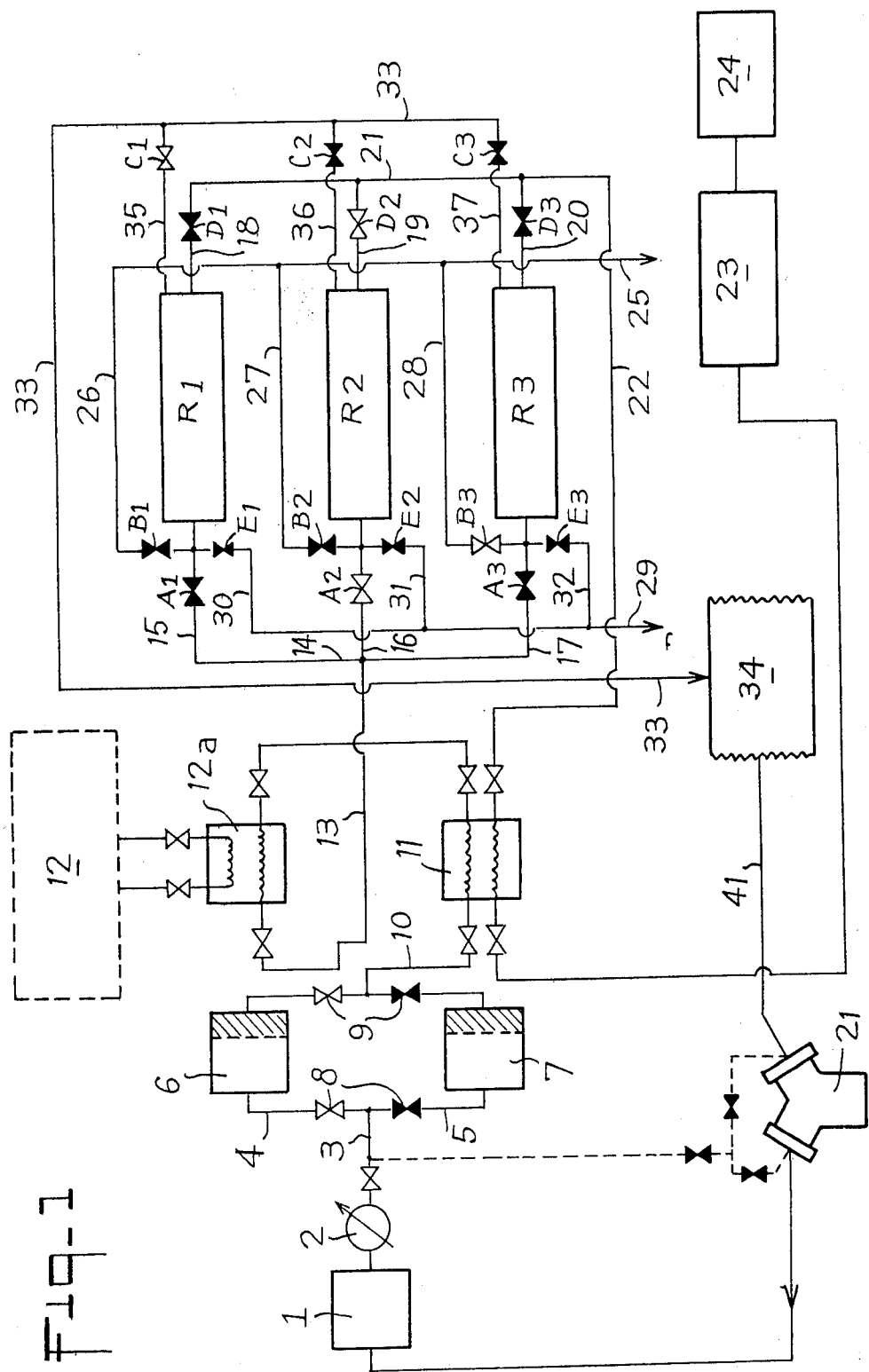
FIG. 1 is a diagram of a continuously running installation for carrying out the process according to the invention.

Referring now to the drawings, FIG. 1 schematically shows an embodiment of a helium purifying installation according to the invention.

The mixture of gas having to be purified, for example a respiratory gas having been used in deep-sea diving, is stored in a tank 1. The working pressure of the phase of adsorption being of the order of 15 bars, the gaseous mixture drawn from the tank 1 is taken to this pressure by means of a pressure regulator 2, or is sucked from a supply cistern, which will be described hereinafter, by means of a compressor $2_1$.

The compressor $2_1$ is preferably of the type with metallic membrane in order not to pollute the gas mixture.

Said mixture collected at the outlet of the pressure regulator 2 is sent through pipes 3, 4, 5 into a pre-treatment unit composed of two filters 6, 7 comprising an adsorbent and/or an absorbent, isolated by two sets of valves 8, 9. These filters, which are of the type with "lost filling", are mounted in parallel to operate alternately and to respond to the process of continuous operation of the installation. For discontinuous operation, the installation would comprise only one filter. Filters 6, 7 are adapted to retain the water, carbon dioxide gas and heavy organic compounds, irreversibly. The gaseous mixture passing through these filters is brought into contact with an activated charcoal to retain the mercaptans and other organic impurities, with a catalyst of the platinum/alumina type to convert the CO into $CO_2$, and with soda lime to retain the carbon dioxide gas.

At the outlet 10 of the filtration unit 6, 7, the mixture of gas is composed of helium $+O_2+N_2+A$ .... The percentage of helium is of the order of 80%.

The mixture issuing from said unit 6, 7 at ambient temperature of the order of $20°-25°$ passes through an economizer 11 and is sent into a cooler $12a$, connected to a refrigerating unit 12, to be taken to the working temperature of the phase of adsorption, this temperature preferably being $-25°$ C.

The phase of adsorption is successively controlled in a continuous cycle in three chromatographic reactors R1, R2, R3.

The mixture issuing at low temperature from the cooler 12 is conducted into a manifold 14 connected to the inlet of each of said reactors by connections 15, 16, 17. The reactors R1, R2, R3, of which an embodiment will be given hereinbelow with reference to FIG. 2, comprises an adsorbent constituted by a microporous charcoal whose pores are of dimensions less than or equal to 20 angströms. The outlet pipes 18, 19, 20 of the reactors R1, R2, R3 are connected to a manifold 21.

The purified helium issuing from said reactors is sent, via pipe 22, through the economizer 11 to return it to ambient temperature which is of the order of $15°$ C. and is taken up by a booster 23 to be stored in another tank 24 at a pressure which may vary between 0 and 200 bars.

The reactors comprise valves A, located on pipes 15, 16, 17 and D on pipes 18, 19, 20 enabling them to be isolated during the cyclic process of purification.

The installation further comprises three circuits, namely a vacuum pipe 25, connected to a vacuum pump (not shown), connected on the other hand to the inlet of the reactors via pipes 26, 27, 28 and isolated by valves B; a purge pipe 29, connected to the inlet of the reactors by connections 30, 31, 32 and isolated by valves E and a pipe 33, opening into a supple cistern 34, and connected to the outlet of the reactors via connections 35, 36, 37 and isolated by valves C.

The supple cistern 34 is connected to the tank 1 for storing the mixture of impure gas via a pipe 41 in whose circuit is inserted the compressor $2_1$.

Figure 2:
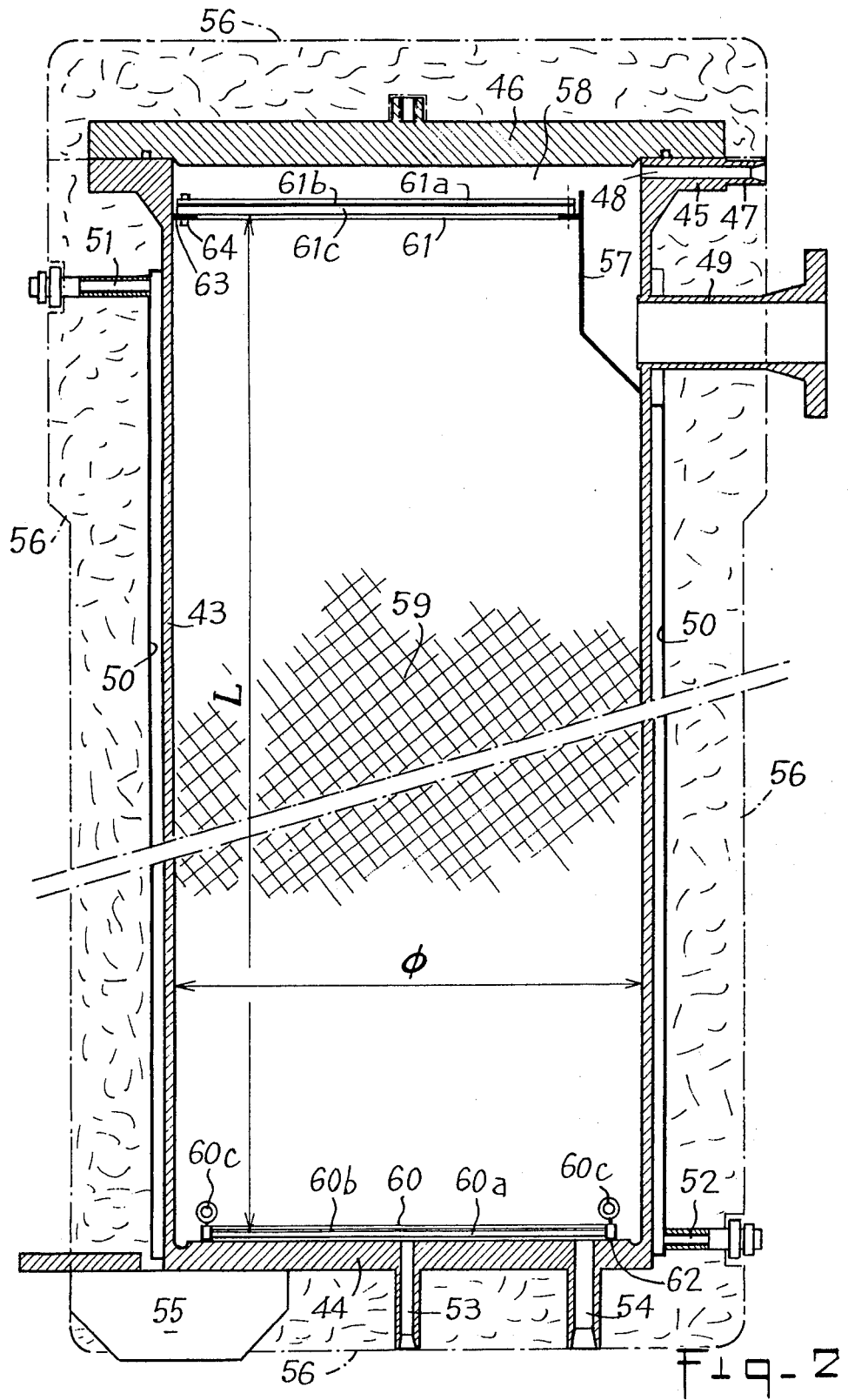
FIG. 2 is a view in longitudinal section of a chromatographic reactor constituting the installation shown in FIG. 1.

One embodiment of the reactors R1, R2, R3 is illustrated in FIG. 2 of the drawings. They are each in the form of a cylindrical tower and each comprises a sleeve 43 forming the lateral wall of the tower, which terminates at its lower end by a bottom 44 and at its upper part by a flange 45 on which a cover 46 is fixed by means of bolts and nuts. The flange comprises on its periphery a radial connection 47 extending by a conduit 48 which opens out into the reactor and through which the mixture of gas to be purified is admitted.

The reactor comprises, in its upper part and below the flange 45, a connection 49 via which evacuation is effected. Said reactor comprises over its height a double envelope 50 with two upper and lower inlet and outlet pipes 51, 52 for the circulation of a heat-conducting fluid making it possible on the one hand to maintain the reactor at the temperature of adsorption and on the other hand to condition the adsorbant with a view to regiving it its maximum performances of adsorption.

The bottom 44 comprises two connections 53, 54. The purified helium flows through connection 53, the other connection 54 is adapted to effect the decompression phase. The fact of decompressing at the bottom of the apparatus makes it possible to optimize at maximum the capacity of adsorption of the micro-porous charcoal.

The reactor is supported by legs 55 located in its lower part at 120° with respect to one another.

The whole is heat-insulated by an envelope 56.

The reactor comprises internally and in its upper part a deflector 57 located in front of pipe 49, which deflector reserves, with the cover 46, a space 58.

The adsorbent 59 is preferably constituted by a microporous charcoal whose pores are of dimensions less than or equal to 20 Å, which charcoal 59 is inserted between two grids 60, 61.

Grid 60 is circular, covers the connections 53, 54 and rests by its weight and under the effect of the microporous adsorbent on the bottom 44 via a seal 62.

This grid is composed of a perforated sheet 60a, which is covered by a sieve 60b whose mesh is 0.25 mm.

Lifting rings 60c are provided for handling thereof.

Grid 61 is located in the upper part of the reactor, close to the cover 46 and is fixed on a generally circular support 63 connected to the sleeve 43 and to the deflector 57 by means of bolts 64.

This grid is composed of a perforated sheet 61a, a sieve 61b, with meshes of 0.25 mm and of a felt plate 61c adapted to distribute the gaseous mixture over the adsorbent. The perforated sheet 61a is superposed on sieve 61b and the felt 61c, which is in contact with the circular support 63.

For an optimum yield of the reactor, and according to the invention, the inner diameter $\phi$ must be at the most one third of the distance L separating the grids 60, 61. This arrangement ensures a regular diffusion of the fluid through the adsorbent 59.

Figure 3:
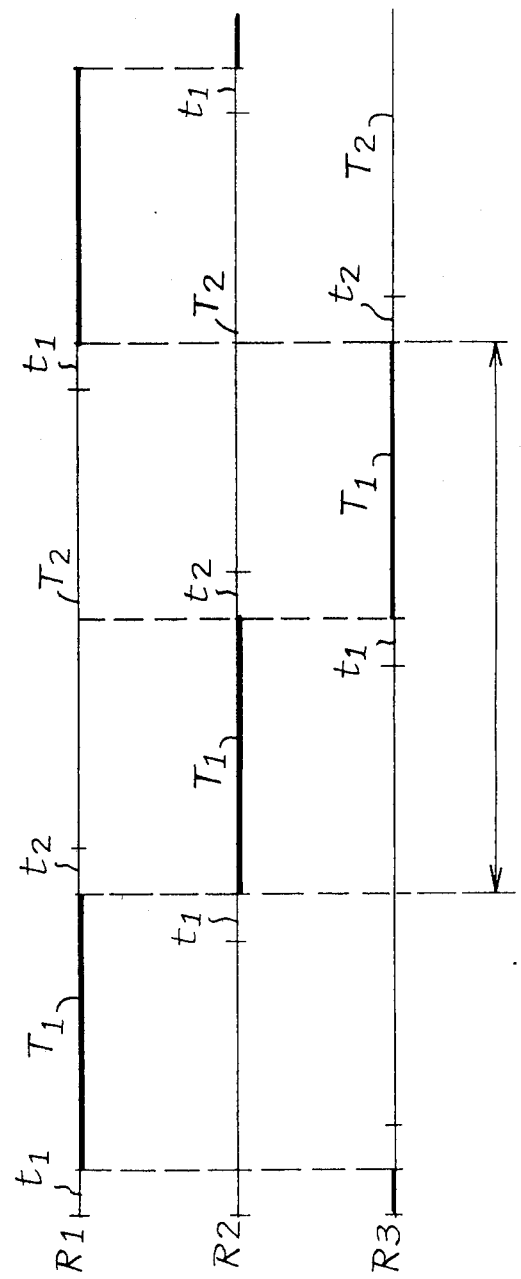
FIG. 3 is a timing chart of the cycles of operation for the continuous running of the installation of FIG. 1 and comprising three chromatographic reactors.

The modus operandi of the installation according to the invention for continuous operation will now be described with reference to the diagram of FIG. 1 and the chart of FIG. 3.

On starting up the installation and periodically, about once per month, the reactors R1, R2, R3 are conditioned by heating in vacuo to high temperature (150° to 200° C.) to eliminate clogging of the adsorbents. The reactors are then returned to low temperature ($-15°/-25°$ C.) to return to the operating conditions.

The gaseous mixture issuing from the tank 1 is previously taken to the working pressure which is preferably 12 to 15 bars, by the pressure regulator 2, or by the compressor $2_1$ which sucks from the supple cistern 34. The mixture passes successively into the pre-treatment unit 6, 7 and into the cooling device constituted by the economizer 11 and the cooler 12a.

(A-a) Valve $A_1$ is opened and the reactor R1 is pressurised with the gas mixture during a period of time $t_1$, for example five minutes.

(b) At the end of this pressurization phase, the phase of adsorption is continued by circulating the gas mixture in the reactor R1 by opening valve D1.

Valves B1, C1, E1 are closed.

Adsorption is maintained for a period $T_1$, of the order of thirty minutes.

(c) At the end of adsorption, the gas mixture is decompressed for a period of time $t_2$, of the order of five minutes, valves A1 and D1 being previously closed; valve C1 is opened and the helium-rich gas is driven into cistern 34 by decompressing it until a pressure of the order of 3 bars is attained.

As soon as this pressure is attained, the valve C1 is closed; valve E1 is opened and the apparatus is purged to reject to the atmosphere the impurities $O_2$, $N_2$ and A contained in the mixture.

(d) At the end of the decompression phase, the valve E1 is closed, the valve B1 is opened and a depression is created in the reactor R1 which is maintained for a period $T_2$, of the order of fifty minutes to regenerate the adsorbent.

(e) At the end of this phase of regeneration, the mixture of gas is compressed for a period of time $t_1$, of the order of five minutes, and the cycle continues on reactor R1.

(B-a) Simultaneously and before the end of the phase of adsorption (Ab) of the reactor R1, the reactor R2 is pressurized by opening valve A2 for a period of time $t_1$, of the order of five minutes, which terminates with the end of the phase of adsorption of the reactor R1; valves B2, C2, E2 are closed.

(b) Valve D2 is opened and adsorption is maintained for a period $T_1$, of the order of thirty minutes, by circulating the gas on the adsorbent.

(c) At the end of adsorption, the gas mixture is decompressed during time $t_2$, of the order of five minutes.

Valves A2 and D2 are previously closed. Valve C2 is opened and the helium-rich gas is driven into cistern 34 by decompressing it until a pressure close to 3 bars is attained. As soon as this pressure is attained, valve C2 is closed, valve E2 is opened and the reactor is purged to reject to the atmosphere the residual impurities $O_2$, $R_2$, A . . . .

(d) At the end of the decompression phase, the valve E2 is closed, valve B2 is opened and the reactor R2 is placed under partial vacuum, which is maintained for a time $T_2$, of the order of fifty minutes to regenerate the adsorbent.

(e) At the end of the regeneration phase of the adsorbent of the reactor R2, the mixture of gas is compressed during time $t_1$, of the order of five minutes and the cycle continues on reactor R2.

(C-a) Simultaneously and before the end of the phase of adsorption (Bb), valve A3 is opened and the reactor R3 is pressurized for a period of time $t_1$, of the order of five minutes, this operation terminating with the end of the phase of adsorption of the reactor R2. Valves B3, C3, E3 are closed.

(b) Valve D3 is opened and adsorption is maintained for a period $T_1$, of the order of thirty minutes.

(c) At the end of adsorption, the gas mixture is decompressed for a time $t_2$, of the order of five minutes. Valves A3, D3 are previously closed. Valve C3 is opened and part of the helium-rich gas is driven into the cistern 34 by decompressing it until a pressure close to 3 bars is attained.

As soon as this pressure is attained, valve C3 is closed, valve E3 is opened and the reactor R3 is purged to reject to atmosphere the residual impurities $N_2$, $O_2$, A . . . .

(d) At the end of the decompression phase, valve E3 is closed, valve B3 is opened and the reactor R3 is placed under partial vacuum, which operation is maintained for a period of time $T_2$, of the order of fifty minutes to regenerate the adsorbent.

(e) At the end of the phase of regeneration of the adsorbent of the reactor R3, the gas mixture is compressed for a period of time $t_1$, of the order of five minutes, and the cycle continues on reactor R3.

The cycle of operation of the installation is arranged so that the phases of adsorption (Bb) of reactor R2 and (Cb) of reactor R3, each of a duration $T_1$ of the order of thirty minutes, are successively produced in the same period of time during which are effected the operations (Ac) of decompression of the gaseous mixture of duration $t_2$ of the order of five minutes; (Ad) of regeneration of the adsorbent of duration $T_2$ of the order of fifty minutes and (Ae) of compression of said mixture of duration $t_1$ of the order of five minutes, effected on reactor R1.

All the operations of opening and closure of valves A,B, C, D, E are controlled by a device incorporating microprocessors.

For an installation in which the reactors have an inner diameter $\phi = 600$ mm and a height between grids of 2017.5 mm, the rate of flow of the treated mixture is 25 m³/hour.

The yield of the installation is in direct relation with the purity of the helium obtained at the outlet of the reactors. For example, for a yield R of 90%, 99% purity is obtained, for a yield R of 95%, 95% purity is obtained, this for a maximum total impurity at the inlet of 20%.

What is claimed is:

1. A process for purification of the helium contained in a mixture of gases and other impurities, employing a pre-treatment unit to retain the impurities such as water, carbon dioxide gas and heavy organic compounds, and at least one chromatographic reactor located downstream of said pre-treatment unit, said process comprising the following steps:

adjusting the pressure of the mixture of gas at the inlet to the reactor until the working pressure of the phase of adsorption of the reactor is obtained, this pressure being between 10 and 30 bars;

adjusting the temperature of the mixture of gas at the inlet to the reactor until the temperature is between −15° C. and 35° C.; and sending the mixture of gas into the reactor and passing it through an adsorbent, which comprises a microporous charcoal whose pores are of dimensions less than or equal to 20 Å.

2. The process of claim 1, wherein, after the adsorption phase, decompression of the mixture of gas is controlled by placing the reactor in communication with the atmosphere, after which phase of decompression, a depression is created in said reactor until a vacuum less than or equal to 1 Torr is attained to regenerate the microporous charcoal.

3. The process of claim 2, wherein the pressure of the residual quantity of the mixture of gas contained in the reactor is firstly reduced until a pressure of between 1 and 5 bars is attained and, during this reduction, the mixture of gas is sent into a storage tank before recycling to recover the helium contained in the mixture and, after having attained this pressure, the reactor is then purged to reject to the atmosphere the quantity of mixture which is too rich in impurities, then said vacuum is created in the reactor.

4. The process of claim 3, wherein the first decompression pressure is about 3 bars.

5. The process of claim 1, 2 or 3, employing three reactors connected together and adapted to be placed separately in communication with the other apparatus of the installation or to be isolated from said apparatus by valves for a continuous purification of the helium, said process comprising a cycle of operation including the following steps:

pressurizing the first reactor with the mixture of gas for a time $t_1$;

at the end of this first pressurization phase, continuing the phase of adsorption by circulating the mixture of gas in the first reactor and maintaining adsorption for a period $T_1$;

at the end of the first adsorption phase, decompressing the mixture of gas for a time $t_2$;

at the end of the first decompression phase, creating a depression in the first reactor which is maintained for a period $T_2$ to regenerate the microporous charcoal;

at the end of the first regeneration phase, starting a new cycle by compressing the mixture of gas for a time $t_1$;

simultaneously and before the end of the first adsorption phase of the first reactor, compressing the mixture of gas for a time $t_1$ which terminates with the end of the first adsorption phase of said first reactor;

at the end of this second compression phase, continuing the phase of adsorption by sending the mixture of gas into the second reactor and maintaining the adsorption for a period $T_1$;

then carrying out second adsorption, decompression and regeneration phases in the second reactor in the same way as in the first reactor;

simultaneously and before the end of the second adsorption phase of the second reactor, compressing the mixture of gas for a time $t_1$ which terminates with the second adsorption phase of said second reactor;

at the end of this third compression phase, continuing the phase of absorption by sending the mixture of gas into the third reactor and maintaining the adsorption for a period $T_1$;

then carrying out third adsorption, decompression and regeneration phases in the third reactor in the same manner as in the first reactor; wherein the phases of adsorption of the second reactor and of the third reactor are effected during the decompression of the gaseous mixture, the regeneration of the microporous charcoal and the compression of said mixture in the first reactor R1; and continuing the process with the three reactors.

6. The process of claim 5, wherein:

times $t_1$ and $t_2$ are both about five minutes;

period $T_1$ is about 30 minutes;

period $T_2$ lasts for a duration of two of the periods $T_1$ less the times $t_1$ and $t_2$; and the decompression phases comprise attaining a pressure between 1 and 5 bars in the reactors.

7. The process of claim 6, wherein the decompression pressure is about 3 bars.

8. The process of claim 1, wherein the working pressure is between 12 and 15 bars and the temperature is about −25° C.

9. An installation for purifying the helium contained in a hyperbaric mixture of respiratory gas, comprising a pre-treatment unit comprising at least one filter containing an adsorbent and/or an absorbent, at least one chromatographic reactor for accepting at the inlet thereof the gas from the filter and from the outlet of which purified helium is sent to a booster, and a high pressure storage unit for accepting the purified helium, wherein the mixture of compressed gas issuing from the pre-treatment unit is sent into an exchanger device comprising an economizer and a cooler, itself connected to a refrigerating unit, which device is located downstream of said pre-treatment unit and upstream of said reactor to place the mixture of gas at the working temperature of the adsorption phase of the reactor, which temperature is in the range −15° C. to −35° C.

10. The installation of claim 9, of which the chromatographic reactor adopts the form of a cylindrical tower and comprises a lwer grid and an upper grid which, with the wall of the tower, delimit the adsorbent, wherein the inner diameter $\phi$ of the reactor is at the most one third of the distance which separates said grids.

11. The installation of claim 9, wherein the working temperature is about −25° C.

* * * * *